United States Patent Office 3,311,821
Patented Mar. 28, 1967

3,311,821
APPARATUS FOR AUTOMATICALLY COMPENSATING THE OUTPUT OF A MAGNETIC FIELD SENSING DEVICE FOR THE EFFECTS OF INTERFERING MAGNETIC FIELDS
Joseph Jean Andre Brunel, Montreal, Quebec, Canada, assignor to Canadair Limited, St. Laurent, Montreal, Quebec, Canada, a corporation of Canada
Filed Feb. 18, 1963, Ser. No. 259,316
Claims priority, application Canada, Dec. 11, 1962, 864,306
9 Claims. (Cl. 324—43)

This invention relates to an automatic compensating device for interfering parasitic magnetic fields and is used in conjunction with a magnetic sensing device hereinafter called the sensing device. Specifically, the compensator compensates for parasitic magnetic interference generated by any vehicle or body as, for example, a sea mine or buoy in which is carried the said sensing device.

This invention is applicable to land, sea, air and space vehicles or sea mines or buoys carrying the said sensing device. However, for the purpose of this disclosure, the invention is described as applying to a magnetic sensing device installation in an aircraft.

Briefly, there are three basic types of interfering (also termed herein as parasitic) magnetic fields which are usually resolved into sixteen components and which are produced in an aircraft during flight and must be compensated for in order to realize the operational capabilities of a sensing device installation in the aircraft. The basic types of interferences are permanent fields normally resolved into three components; induced magnetic fields normally resolved into five components and eddy current fields normally resolved into eight components. Each of the above sixteen components of the interference would normally require individual component compensation providing the cause of the interference therefrom is sufficiently large to decrease the capability of the sensing device.

Induced field compensation in aircraft installations normally is fixed and consists of permalloy strips mounted near the detecting element of the sensing device. Compensation for permanent fields is achieved by varying the current through three mutually perpendicular coils; eddy current fields may be compensated for by adjusting a resistance in series with coils placed in proximity to the sensing device. In both of the latter cases, manual adjustment of a resistance in series with each of these coils has been required. This series resistance is varied in steps while the aircraft is performing a series of sustained pitch, roll, or yaw manoeuvres on selected cardinal headings until a null setting is obtained.

There is one null setting for all orientations of the aircraft. Usually, a graph representing the sensing device output signal against the setting of the compensator is plotted point by point as part of this procedure. The flights for the initial compensator adjustment of an aircraft through use of this procedure have lasted approximately five hours each, and it has taken at least two flights per aircraft.

Of the many disadvantages of the old manual procedure, the consumption of time is perhaps the most conspicuous. It requires half an hour of flight tests for merely routine permanent compensation adjustment. Thus, the compensation may not be performed as often as would be required to maintain the detection capability of the installation at its maximum. Another disadvantage associated with time is the cost, since up to ten hours of flight per aircraft may be required for the initial compensation adjustment.

Another disadvantage of the old manual procedure is that it has been necessary to search for and operate within an area which has low magnetic noise levels, i.e. where the ambient magnetic field is uniform in space and constant in time.

A further disadvantage lies in the special skill required on the part of the operator using the aforementioned manual procedure. Another associated personnel problem arises from the utilization of many pitch, roll and yaw manoeuvres in order to achieve the required compensation; as a result, the personnel tend to become sick and therefore must be chosen on the basis of exceptional physical fitness.

It has been found that these disadvantages can be largely overcome by providing a compensating apparatus wherein the compensators are automatically adjusted, that is, adjusted once and for all. Such automatic adjustment is responsive to manoeuvres of the aircraft. The compensating apparatus reduces the error produced in the sensing device by the signals from the interfering magnetic fields to substantially negligible values. The various error components previously described require compensation means for each one of said components to thereby nullify their effect upon the sensing device system. Accordingly, in one aspect, the present invention provides a method of compensating a magnetic field sensing device for the effects of interfering magnetic fields comprising correlating the output signal of the sensing device with a transducer output signal which is representative of the position, or rate of change or position or derivatives thereof, of the sensing device, said correlation being effected by multiplication of said signals to produce a resultant signal having a D.C. component which is representative of a selected error component of said output signal of the sensing device, which error component results from a component of an interfering magnetic field, and using said resultant signal to vary the effect on the sensing device of a compensator device in such a way as to reduce the amount of said error component in said output signal.

In another aspect there is provided apparatus for automatically compensating the output of a magnetic field sensing device for the effects of interfering magnetic fields comprising a transducer adapted to provide a signal representative of the position, or rate of change of position or derivatives thereof, of the sensing device, a correlator which is adapted to multiply signals from said transducer and said sensing device and to provide an output signal having a D.C. component which is representative of the amount of an error component present in said sensing device output due to a given component of interfering magnetic field, and a compensator device responsive to said correlator output signal and adapted to counter the effect of said sensing device of said magnetic field component in such a way, as to decrease the amount of said error component.

In the above described combination, the sensing device, the correlator and the compensator device associated with the sensing device form a closed loop. The transducer output is fed into this servo loop. The loop described includes only one component compensator which is adjusted and it is obvious that as many component compensators are required as there are components of interference requiring compensation.

If desired, duplicate loops may be used and operated simultaneously. Loops which cannot be used consecutively may be bypassed by suitable switching means. The duplicate loops, however, can share the same transducers, correlators and generally all of the elements that are used only for the adjustment of one compensator.

The invention is illustrated by way of example in the accompanying drawing, wherein.

Figure 1:
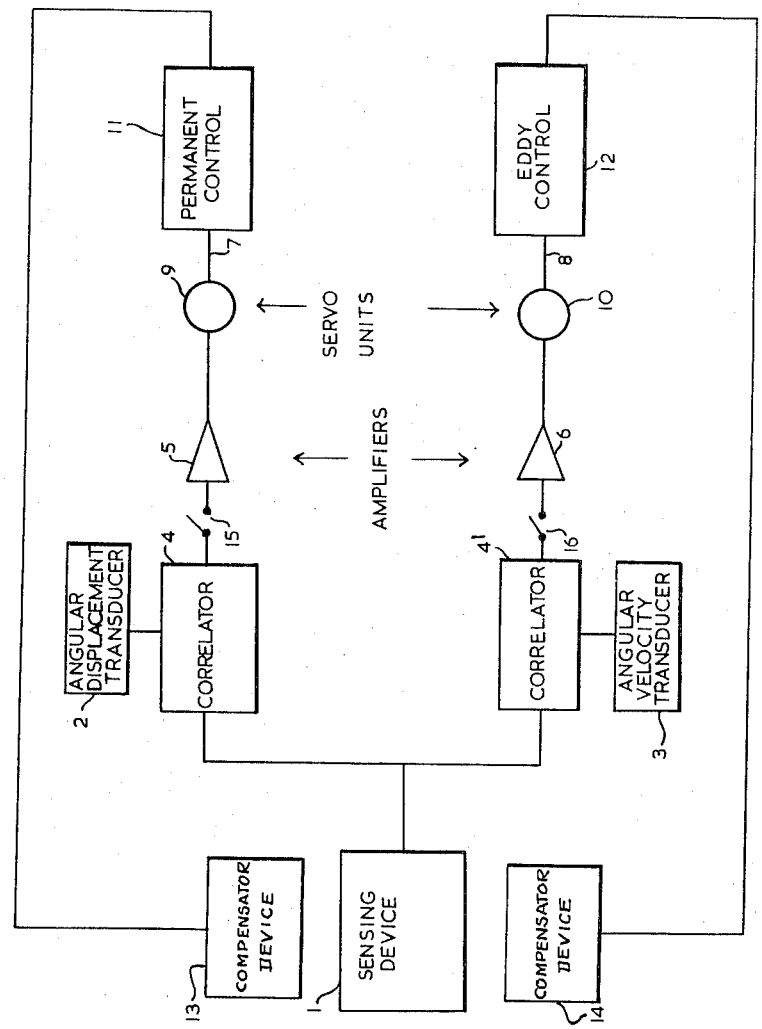
FIGURE 1 is a block diagram illustrating a pair of loops to be adjusted simultaneously, each adapted to compensate for an associated component of interference.

The drawing shows a block diagram for an automatic compensating device according to one embodiment of the invention, and includes a sensing device, a correlating system, servo mechanisms, amplifying means, compensating means, and control means.

The compensating apparatus receives the output from the sensing device 1. As shown the apparatus comprises two servo loops. The first loop includes a manoeuvre attitude correlator 4. The manoeuvre attitude correlator 4 includes an angular displacement transducer 2 which can be for example the gyros of the aircraft, magnetic sensing devices fixed to the significant axis of the aircraft, or angular accelerometers the output of which is integrated twice. The second loop, includes a manoeuvre rate correlator 4'. The manoeuvre rate correlator 4' includes an angular velocity transducer 3, which can be for example coils fixed to the aircraft, rate gyros, angular accelerometers the output of which is integrated once, or magnetic sensing devices fixed to the aircraft, the output of sensing devices is differentiated once. The correlators 4 and 4' can be Hall Effect multipliers, ring modulators or any devices having two separate input signals and having as an output multiplication of said signals. It is also possible to perform the correlation by adding two signals proportional to the logarithms of the outputs of the sensing device 1 and of the angular displacement or velocity transducers 2, 3 respectively, and taking the antilogarithm of said sum of said logarithms. By performing a multiplication of the input signals of the respective correlators 4, 4' an output signal having a D.C. component is obtained, the amplitude of said D.C. component being a measure of the lack of compensation in respect of manoeuvre attitude (i.e. angular position) and manoeuvre rate (i.e. angular velocity) respectively.

The respective servo mechanisms comprise respective amplifiers amplifying 5 and 6, and respective servo motors 9, 10 connected in series with the attitude correlator 4 and the rate correlator 4' respectively. Respective interrupting devices 15, 16 are provided for the opening or closing the respective servo loops.

The compensating apparatus in this example includes in the respective first and second servo loops a permanent or induced component compensator control 11 and an eddy current component compensator control 12 each of which controls may be potentiometers. The respective controls 11 and 12 are associated with respective component compensator devices 13, 14, which are adapted to compensate the sensing device 1 for permanent or induced and eddy current components, respectively.

Figure 2:
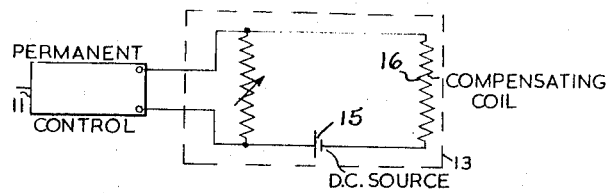
FIGURE 2 represents a compensating circuit for a component of a permanent magnetic field, the same reference numerals being used as employed in FIGURE 1.
Figure 3:
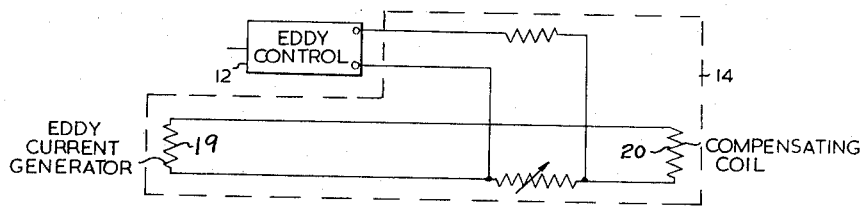
FIGURE 3 represents a compensating circuit for a component of eddy current.
Figure 4:
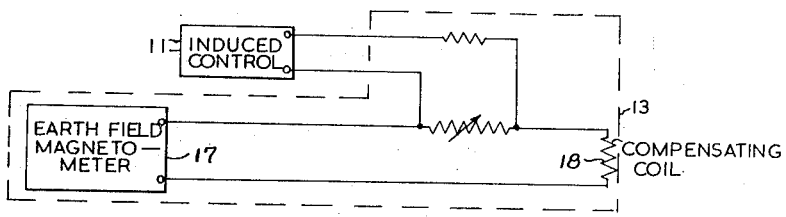
FIGURE 4 represents a compensating circuit for a component of an induced magnetic field.

The device 13 may comprise, for example, (a) a permanent magnetic field component compensator as shown in FIGURE 2 comprising a current source 15 and a coil 16 fixed to the aircraft and positioned in proximity to the detecting element of the sensing device 1; or (b) an induced magnetic field component compensator as shown in FIGURE 4 comprising an earth field magnetometer 17 fixed to the aircraft and located at any appropriate position therein to detect induced field components, and a coil 18 fixed to the aircraft and positioned in proximity to the detecting element of the sensing device 1. The eddy current component compensator device 14 as shown in FIGURE 3 may comprise at least one generating coil 19 and at least one compensating coil 20 fixed to the aircraft, at least one of which is positioned in proximity to the detecting element of the main sensing device 1. The permanent or induced component and eddy current component compensator devices 13 and 14 may have in common a coil which is in proximity to the detecting element of the main sensing device 1. The effectiveness of the two compensator devices 13 and 14 may be varied either by changing the current in the coils or by changing the position of the coils in relation to the detecting element of the main sensing device 1.

Alternatively, the magnetic field component compensator devices 13, 14 could be replaced by feeding the output of the respective compensator controls 11, 12 directly into an internal electrical network (not shown) of the main sensing device 1. In using this method of compensation, however, care must be taken to match correctly the input impedance of the sensing device 1 in respect of the signals from the respective compensator controls 11, 12 and the output impedance of the respective compensator controls 11, 12 so as to annul any interference between one servo loop and the other.

During the process of varying the amount of compensation produced by the compensators as the servo motors 9, 10 adjust the respective controls 11, 12 when seeking for a null, interrupting devices 15 and 16 must be closed thereby activating the two servo loops. During aircraft manoeuvres, the signal from the main sensing device 1, has for example, two error components which are due to interfering magnetic fields; one component is a permanent or induced component and the other component an eddy current component of said interfering magnetic field. These components will be correlated with, that is, will have the same frequencies as, signals representative of aircraft manoeuvre attitude and aircraft manoeuvre rate respectively, as contrasted with the remainder of the said signal, the "true" signal, which will in general be uncorrelated. The signal from the main sensing device 1 passes to both the manoeuvre attitude correlator 4, and the manoeuvre rate correlator 4'. Each of said correlators 4, 4' receives, at the same time, a signal from the respective transducers 2, 3 which will be of the same frequency as the respective error components. The manoeuvre attitude correlator 4, therefore, produces an output signal having a D.C. component which is proportional to the produce of the angular displacement signal from the transducer 2 and the permanent or induced error component from the sensing device 1 and which is representative, therefore, of the lack of aircraft attitude compensation. Similarly the manoeuvre rate correlator 4' produces an output signal having a D.C. component which is proportional to the products of the signal from the angular velocity transducer 3, and the eddy current error component of the signal from the sensing device 1 and which is representatives, therefore, of the lack of aircraft manoeuvre rate compensation.

The output signals from the respective correlators 4, 4' are, then transmitted through the respective amplifiers 5, 6 which actuate the respective servo motors 9 and 10. The permanent or induced component compensator control 11 and the eddy current component compensator control 12, are respectively adjusted by the associated servo motors 9 or 10 to control in turn the amount of compensation applied to the sensing device 1 by the permanent or induced component compensator device 13 and the eddy current component compensator device 14, respectively. The net interfering magnetic fields produced by the two error components herein considered, that is, permanent or induced and eddy current components, are thus reduced nullifying the corresponding error components of the output signal of the main sensing device 1. The operation of the apparatus to effect automatic compensation, assuming that it is desired to compensate for a particular permanent or induced and eddy current component of the interfering magnetic fields is as follows. The operator of the sensing device 1 requests that the aircraft performs such manoeuvres on such a heading that the output signal of the sensing device 1 contains error components. He then closes the servo loops by closing interrupting devices 15, 16 and waits a few seconds until the error components are reduced to negligible values, at which time he will request that the manoeuvres to be stopped.

Where the permanent or induced component compensator control 11 and the eddy current component compensator control 12 comprise electro-mechanical devices, suitable servo motors 9, 10 may be incorporated as hereinbefore described to translate the electrical signals if required into mechanical movement. The amplifiers 5 and 6 are provided if the electrical energy required by the respective servo motors 9 and 10 is more than that provided by the correlators 4 and 4'.

It will be appreciated that when both components of the signal from the sensing device 1 have been compensated in the respective servo loops the respective component compensator controls 11, 12 will reach such positions that the said error components will fall to negligible values. The output signal of the main sensing device 1 will thereafter be a 'true' signal substantially uninfluenced by the two interfering magnetic field components chosen in this example.

In practice, when all error components of the output signal of the sensing device 1 have been similarly compensated, the net error is reduced to insignificant proportions and the signal to noise ratio of said output signal is correspondingly increased.

Although the invention has been described in terms of only one and two servo loops, that is to say, one loop for compensating for permanent or induced field components and one loop for compensating for eddy current field components, it will be appreciated that apparatus according to the invention may generally be constructed in alternative manners to that described above. One possibility is to build a compensating apparatus which will compensate only for the three permanent magnetic field components, in which case the device would have three loops. It is also possible to build an apparatus having only one correlator and one servo mechanism, in which the servo motor is made to adjust each of the three compensator controls in turn, through appropriate switching means, for example, magnetic clutches. It is also possible to construct an apparatus for compensating all possible sixteen components of magnetic interference. Generally though, it is expected that for each type of vehicle the automatic compensating apparatus will be designed to compensate only for those magnetic field components which have been found to interfere. This could be for example the three permanent components, two out of the five induced components and two out of the eight eddy current components. It is also possible to conceive that in certain installations only certain components of interference will require periodic automatic compensation.

In some other installations, it might be desirable to install part of the compensating apparatus permanently in the vehicle which carries the main sensing device 1 while the other parts would be part of the ground test facility.

When the compensating apparatus is designed for compensating for more than one permanent or induced and more than one eddy current component, the various components of a similar nature (e.g. all the in-phase or all the quadrature components) may still have to be separated through (in the case of aircraft-mounted apparatus) appropriate manoeuvers (e.g. roll, pitch or yaw) on appropriate cardinal headings.

I claim:

1. Apparatus for automatically compensating the output signal of a magnetic field sensing device for the effects of interfering magnetic fields comprising transducing means for providing a signal representative of the position, or derivatives thereof with respect to time, of the sensing device, means for correlating said signals from said transducer and said sensing device to provide an output signal representative of the amount of an error component present in said sensing device output signal due to a given component of said interfering magnetic fields, and compensator means responsive to said correlator output signal for countering the effect on said sensing device of said interfering magnetic field component in such a way as to decrease the amount of said error component.

2. Apparatus as in claim 1 wherein said transducer output signal is of substantially the same frequency as said error component of the sensing device output signal.

3. Apparatus as in claim 1 where said correlator comprises means for multiplying said output signals from said transducer and said sensing device.

4. Apparatus as in claim 1 including means responsive to said correlator for controlling said compensator means.

5. Apparatus as in claim 4 where said compensator control means includes a servomechanism responsive to said correlator and a potentiometer responsive to said servomechanism for controlling said compensator means.

6. Apparatus as in claim 1 where the compensator means includes coil means located in proximity to said sensing device for producing a compensating magnetic field in dependence on the current passed through said coil means.

7. Apparatus as in claim 1 including a plurality of respective groups of transducers, correlators and compensator means responsive to the said sensing device output signal for compensating the said output signal of the sensing device for different respective components of said interfering magnetic fields.

8. Apparatus as in claim 7 wherein first and second respective groups of transducers, correlators and compensator means are responsive to the said sensing device output signal for compensating the output of the sensing device for respective first and second error components thereof, said error components resulting from permanent and eddy current components respectively of said interfering magnetic fields, said permanent and eddy current components being generated by a body carrying the said sensing device.

9. Apparatus as in claim 8 where the first transducer is a transducer indicating an angular displacement of said body and second transducer is a transducer indicating an angular velocity of said body.

No references cited.

RUDOLPH V. ROLINEC, *Primary Examiner.*

RICHARD B. WILKINSON, *Examiner.*

R. J. CORCORAN, *Assistant Examiner.*